(12) United States Patent
Goel et al.

(10) Patent No.: US 8,615,427 B2
(45) Date of Patent: Dec. 24, 2013

(54) DETERMINING A VALUE FOR A COUPON

(75) Inventors: Deepak Goel, Fremont, CA (US); Kavel Patel, Santa Clara, CA (US); Sajjit Thampy, Sunnyvale, CA (US)

(73) Assignee: Coupons.com Incorporated, Mountain View, CA (US)

( * ) Notice: Subject to any disclaimer, the term of this patent is extended or adjusted under 35 U.S.C. 154(b) by 0 days.

(21) Appl. No.: 13/277,152

(22) Filed: Oct. 19, 2011

(65) Prior Publication Data

US 2013/0103474 A1    Apr. 25, 2013

(51) Int. Cl.
*G06Q 30/00*    (2012.01)

(52) U.S. Cl.
USPC ........................................................ 705/14.21

(58) Field of Classification Search
USPC ........................................................ 705/14.21
See application file for complete search history.

(56) References Cited

U.S. PATENT DOCUMENTS

| | | | |
|---|---|---|---|
| 4,745,468 A | 5/1988 | Von Kohrn | |
| 4,876,592 A | 10/1989 | Von Kohrn | |
| 4,926,255 A | 5/1990 | Von Kohrn | |
| 5,034,807 A | 7/1991 | Von Kohrn | |
| 5,057,915 A | 10/1991 | Von Kohrn | |
| 5,128,752 A | 7/1992 | Von Kohrn | |
| 5,227,874 A | 7/1993 | Von Kohrn | |
| 5,249,044 A | 9/1993 | Von Kohrn | |
| 5,283,734 A | 2/1994 | Von Kohrn | |
| 5,368,129 A | 11/1994 | Von Kohrn | |
| 5,508,731 A | 4/1996 | Kohrn | |
| 5,697,844 A | 12/1997 | Von Kohrn | |
| 5,713,795 A | 2/1998 | Von Kohrn | |
| 5,759,101 A | 6/1998 | Von Kohrn | |

(Continued)

FOREIGN PATENT DOCUMENTS

| | | |
|---|---|---|
| AU | 2006/294868 | 6/2011 |
| JP | 2010/055360 | 3/2010 |
| JP | 2010/0262652 | 11/2010 |
| KR | 2010/0025578 | 3/2010 |

OTHER PUBLICATIONS

Notification of Transmittal of the International Search Report and the Written Opinion of the International Searching Authority, or the Declaration, PCT Application No. PCT/US2012/059553 dated Mar. 18, 2013, 10 pages.

(Continued)

*Primary Examiner* — John G Weiss
*Assistant Examiner* — Scott C Anderson
(74) *Attorney, Agent, or Firm* — Hickman Palermo Truong Becker Bingham Wong LLP; Daniel D. Ledesma

(57) ABSTRACT

Techniques are provided for determining, by a coupon distributor, a value for a coupon of a product or service that will be provided by a coupon provider. The coupon provider provides, to the coupon distributor, one or both of a budget value that indicates an amount the coupon provider is willing to pay the coupon distributor for distributing the coupon, and a redemption rate that indicates one or more target redemption rates. The coupon provider uses a coupon value equation to calculate the coupon value based on a budget value and a redemption rate. The coupon provider might estimate that no coupon value will allow the coupon provider to stay within the budget and ensure that the actual redemption rate will be close to a particular redemption rate, which may or may not be specified by the coupon distributor.

32 Claims, 2 Drawing Sheets

(56) References Cited

U.S. PATENT DOCUMENTS

| | | | |
|---|---|---|---|
| 5,761,648 A | 6/1998 | Golden et al. | |
| 5,791,991 A | 8/1998 | Small | |
| 5,907,830 A | 5/1999 | Engel et al. | |
| 5,916,024 A | 6/1999 | Von Kohrn | |
| 5,974,399 A * | 10/1999 | Giuliani et al. | 705/14.25 |
| 6,321,208 B1 | 11/2001 | Barnett | |
| 6,336,099 B1 | 1/2002 | Barnett et al. | |
| 6,609,104 B1 * | 8/2003 | Deaton et al. | 705/14.39 |
| 6,965,868 B1 * | 11/2005 | Bednarek | 705/7.14 |
| 7,248,693 B1 | 7/2007 | Tretter et al. | |
| 7,418,451 B2 | 8/2008 | Leung et al. | |
| 7,640,240 B2 | 12/2009 | Boal et al. | |
| 7,734,621 B2 | 6/2010 | Weitzman et al. | |
| 7,761,378 B2 * | 7/2010 | Postrel | 705/40 |
| 7,784,702 B2 | 8/2010 | Michels | |
| 7,962,931 B2 | 6/2011 | Bova | |
| 8,000,496 B2 | 8/2011 | Keswanie et al. | |
| 8,055,642 B2 | 11/2011 | Boal et al. | |
| 8,165,078 B2 | 4/2012 | Walsh et al. | |
| 2004/0267611 A1 | 12/2004 | Hoerenz | |
| 2007/0156523 A1 | 7/2007 | Liu et al. | |
| 2008/0065490 A1 * | 3/2008 | Novick et al. | 705/14 |
| 2009/0061884 A1 | 3/2009 | Rajan et al. | |
| 2010/0042490 A1 | 2/2010 | Boal | |
| 2010/0088166 A1 | 4/2010 | Tollinger | |
| 2010/0250351 A1 | 9/2010 | Gillenson et al. | |
| 2011/0078009 A1 | 3/2011 | Macaluso | |
| 2011/0106598 A1 | 5/2011 | McCann et al. | |

OTHER PUBLICATIONS

Claims from PCT Application No. PCT/US2012/059553, dated Mar. 2013, 4 pages.

Notification of Transmittal of the International Search Report and the Written Opinion of the International Searching Authority, or the Declaration, PCT Application No. PCT/US12/59568 dated Mar. 29, 2013, 8 pages.

Claims from PCT Application No. PCT/US12/59568, dated Mar. 2013, 3 pages.

* cited by examiner

DETERMINING A VALUE FOR A COUPON

TECHNICAL FIELD

Embodiments relate generally to determining, on behalf of a coupon provider and based on multiple factors, a value for a coupon.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate or other document that entitles its holder to accept an offer described or referenced by the coupon. The offer, also subsequently referred to as the "coupon offer," may be any type of offer, but typically is an offer by the coupon provider to provide a customer with one or more goods or services at a particular price or discount. For example, a coupon might indicate $1 off or 25% off of the purchase price or might indicate a particular price, such as $10. Alternatively, the coupon offer may be an offer to provide the customer with a gift in exchange for the performance of an act, such as purchasing a good or service.

A coupon often takes a "hard copy" form, such as a paper certificate, with printed images and/or text describing terms of the offer. "Redeeming" a coupon is the process of a customer accepting a coupon offer by presenting, referencing, or otherwise providing the coupon while purchasing, contracting, or otherwise transacting with another party. For example, a customer may redeem a hard copy of a coupon by handing the copy to a clerk during a purchase at a retail store. The clerk may then provide the customer with the offered discounted price or gift.

One technique for distributing coupons is to include printed coupons with newspapers, magazines, or other items that are distributed to customers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide customers with opportunities to print their own coupons. For example, a number of websites provide search engines or catalogs with which customers may locate offers and then print coupons for the offers they find. The printed coupons may be used in the same manner as any other coupon.

Other recent distribution techniques involve creating digital coupons. One such technique involves creating unique digital coupons that are saved to an account associated with the customer, such as a store loyalty account. The customer may redeem such digital coupons during online or physical transactions by presenting an account identifier, such as a store loyalty card or an oral identification of the customer's telephone number, for the associated account.

Another digital coupon-based technique involves creating unique digital coupons that may be stored on a computing device. The digital coupons may be transmitted from the computing device at a point-of-sale during a transaction using any of a variety of mechanisms. Thus, there are numerous ways in which coupons might be distributed to customers.

One problem that coupon providers (for example, product manufacturers and service providers) face is determining a value for a coupon during a particular coupon campaign. Current techniques do not provide enough flexibility, accuracy or commercial benefit for coupon providers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
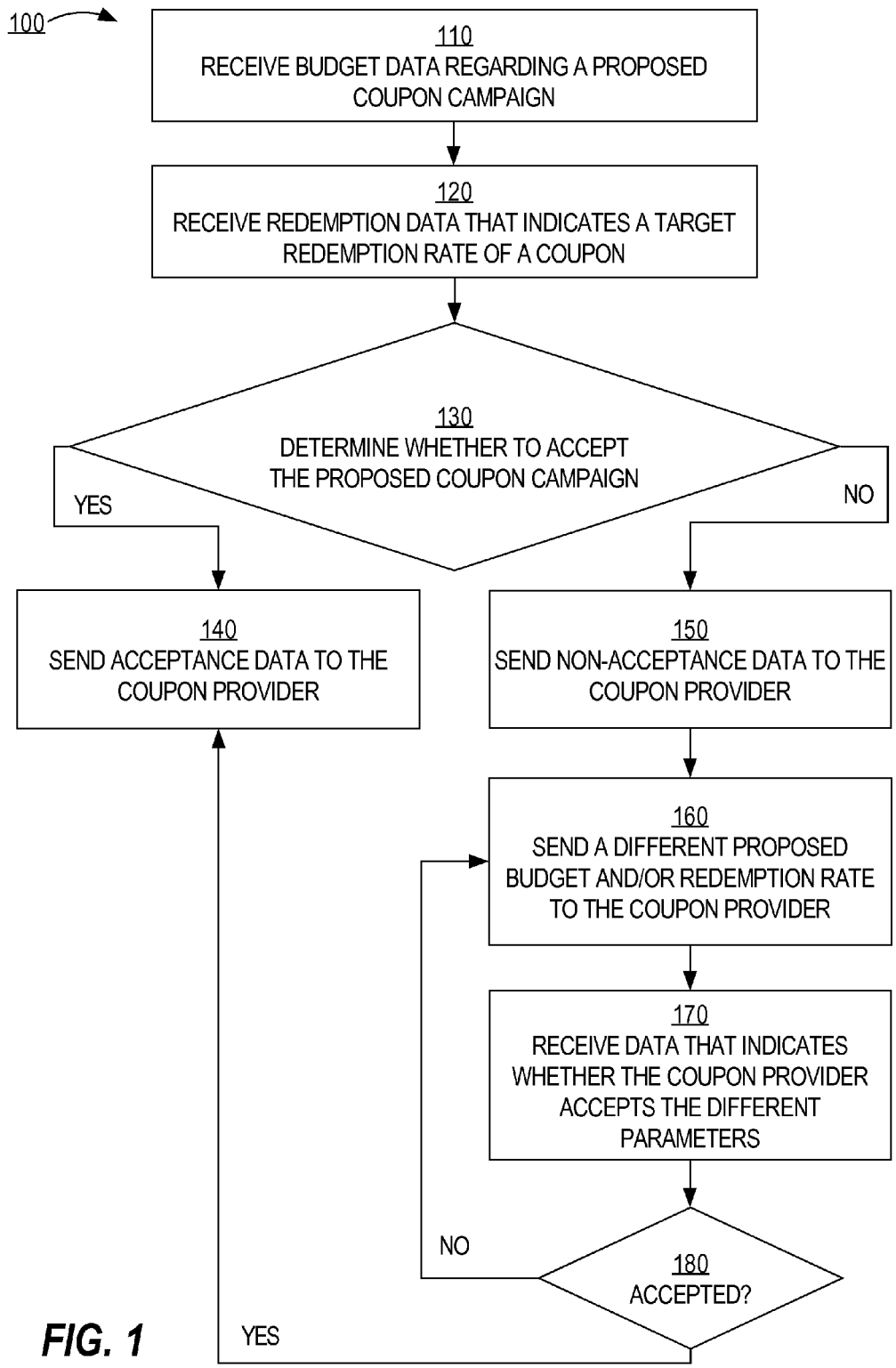
FIG. 1 is a flow diagram that depicts a process for determining a value for a coupon, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Functional Overview
    3.0. Determining A Coupon Value
        3.1. Example Equation
        3.2. Redemption Rate Function
    4.0. Implementation Mechanism—Hardware Overview
    5.0. Extensions and Alternatives 1.0. General Overview Techniques are disclosed for determining a value for a coupon. In this context, a "coupon campaign" is initiated by a coupon provider and involves the distribution, by a coupon distributor, of a particular coupon (or set of coupons) regarding, for example, a product or set of products. Typically, a coupon campaign lasts for a certain period of time. For example, many coupons are valid for a limited period of time, such as a few months, and end on a specific date.

The greater the value of a coupon for a coupon campaign, the more likely the coupon will be printed and, ultimately, redeemed. Also, the more a product or service is purchased, the greater the chance that customer loyalty in that product or service increases, ensuring future purchases. However, with more coupon redemptions, a coupon provider effectively trades purchases of its products or services for lower profit margins or even negative margins. Nevertheless, for the coupon provider, a sale at a discounted price is typically better than no sale at all.

Conversely, the lower the value of a coupon for a coupon campaign, the less likely the coupon will be printed and redeemed. Thus, for example, it might take longer for a $1 coupon to be redeemed a certain number of times relative to a $1.50 coupon for the same product or service. However, coupon providers typically desire to "move" or sell a certain number of products during a particular time period. Thus, the value for a coupon that encourages the sale of that number of products without causing an over sale of the product using the coupon is important.

Many times, a coupon provider does not have enough knowledge regarding how many coupons will be redeemed given a certain coupon value. This lack of knowledge carries a cost because the coupon provider could have diverted some of its resources that are used to initiate and fund a coupon campaign elsewhere or could have increased the coupon value slightly with a significantly higher redemption rate. The following table illustrates how two different hypothetical coupon campaigns for the same product can yield very different results, depending on the coupon value.

TABLE A

| Coupon Campaign | Coupon Value | Prints | Redemptions | Cost to Provider | Revenue to Distributor |
| --- | --- | --- | --- | --- | --- |
| A | $1.00 | 100 | 20 | $20 + $10 = $30 | 100*$0.10 = $10 |
| B | $0.50 | 150 | 20 | $10 + $15 = $25 | 150*$010 = $15 |

In both coupon campaigns, a coupon distributor charges $0.10 for each print of a coupon by a potential customer. According to coupon campaign A, the coupon value is $1.00, potential customers or end-users printed 100 coupons, and 20 of the printed coupons were redeemed. The cost to the coupon provider is the number of redemptions times the coupon value (i.e., 20*$1.00 in this scenario) plus the number of prints times the charge per print (i.e., 100*$0.10). According to coupon campaign B, the coupon value is $0.50, potential customers or end-users printed 150 coupons, and 20 of the printed coupons were redeemed. Again, the cost to the coupon provider is the number of redemptions times the coupon value (i.e., 20*$0.50 in this scenario) plus the number of prints times the charge per print (i.e., 150*$0.10). For both the coupon provider and the coupon distributor, coupon campaign B is preferable to coupon campaign A (although coupon campaign B may have taken longer to run relative to coupon campaign A in order to reach 150 prints). Relative to coupon campaign A, running coupon campaign B instead allows the coupon provider to save $5 and the coupon distributor to increase its profit by $5. However, for each coupon campaign, the coupon provider must guess at what the most appropriate coupon value should be. In an embodiment, a coupon distributor leverages its knowledge of previous redemption rates given certain coupon values to propose a coupon value to a coupon provider, such as a product manufacturer or service provider. According to an embodiment, a coupon distributor receives, from a coupon provider (or prospective coupon provider), one or both of (1) budget data that indicates an amount for allocating to a proposed coupon campaign and (2) redemption data that indicates a number of anticipated redemptions of the corresponding coupon (i.e., that is part of the proposed coupon campaign). The coupon distributor uses this data and historical data (that indicates a relationship between actual coupon values and their corresponding redemption rates during previous coupon campaigns) to determine whether to accept the proposed coupon campaign and, if so, what value to price the coupon.

Such an approach to negotiating terms of a coupon campaign is fundamentally different than the prior approach where the coupon provider dictates what the coupon value will be and might negotiate on what the coupon distributor will charge per printed coupon. In contrast, in approaches described herein, the coupon distributor determines the coupon value while the coupon provider dictates an overall budget it will pay for the coupon campaign and/or a redemption rate for the coupon(s) of the proposed coupon campaign.

Also, in the prior approach, the coupon provider takes on the risks associated with a coupon campaign. The coupon provider essentially hopes that the coupon value chosen causes a certain number of products to be moved. Because the coupon distributor is paid per print and stops a campaign when a certain number of coupons are printed, the coupon distributor takes relatively little risk in ensuring the success of the campaign. In contrast, in approaches described herein, the coupon distributor assumes much of the risks associated with a coupon campaign. The coupon provider has a budget and may dictate a target redemption rate while the coupon distributor must ensure that the target redemption rate is met or else the coupon distributor might lose money on (and possibly credibility with respect to) the coupon campaign. The coupon distributor is willing to take that risk due to stored information about coupon values and redemption rates associated with prior campaigns.

Although embodiments are applicable to coupons for services, for purposes of brevity, the following description refers only to coupons for products. Also, "coupon provider" refers to an entity (such as a manufacturer of a product or a service provider) that seeks to have one or more coupons for its product to be distributed to potential customers. In an embodiment, a third-party entity or agency represents a manufacturer and acts on their behalf. Thus, such an agency may be viewed as a coupon provider, at least from the perspective of the coupon distributor.

2.0. Functional Overview

FIG. 1 is a flow diagram that depicts a process for determining a value for a coupon, according to an embodiment. In an embodiment, process steps may be performed by one or more devices operating on behalf of a coupon distributor.

In the example process 100 of FIG. 1, at block 110, the coupon distributor receives budget data that indicates an amount that a coupon provider is willing to pay the coupon distributor for handling a proposed coupon campaign.

At block 120, the coupon distributor also receives redemption data that indicates a target redemption rate of a coupon (or set of coupons) in the proposed coupon campaign. The redemption rate may refer to a number of redemptions of a coupon. The redemption data may indicate a single value (for example, 1000) or a range of values (for example, 950-1050). Although depicted as occurring after block 110, block 120 might occur before or concurrently with block 110.

At block 130, the coupon distributor determines whether it will accept the proposed coupon campaign based on the budget data and redemption data. If so, then, at block 140, the coupon distributor sends, to the coupon provider, data that indicates that the proposed coupon campaign is accepted. The coupon distributor begins the proposed coupon campaign according to one or more details of the proposal. The coupon distributor may accept a proposed coupon campaign even though the coupon distributor anticipates that it may make very little or no profit on the proposed coupon campaign. The coupon distributor may do this in order to establish a relationship with a particular coupon provider that turns into future business with that provider.

If, at block 130, the coupon distributor determines that it will not accept the proposed coupon campaign, then, at block 150, the coupon distributor informs the coupon provider as much. Such a determination might be made if the coupon distributor predicts that there is no coupon value that would allow the coupon distributor to make a profit based on the budget data while ensuring that the proposed redemption rate is likely to be met (for example, within a certain margin of error).

At block 160 (or as part of block 150), the coupon distributor determines a different budget and/or different redemption rate that the coupon distributor will accept. The coupon distributor also provides that data to the coupon provider. For example, if the coupon distributor determines that no coupon value will allow the coupon distributor to stay within the budget and still hit the redemption rate target, then the coupon distributor might calculate a coupon value with a different (for example, increased) budget value and/or with a different (for example, reduced) target redemption rate.

At block 170, the coupon distributor receives data that indicates whether the coupon provider accepts the terms of the updated proposed coupon campaign, i.e., including a different budget and/or redemption rate.

At block 180, the coupon distributor determines whether the coupon provider accepts the updated proposal. If so, then process 100 proceeds to block 140 where the coupon distributor sends, to the coupon provider, an acknowledgement that the coupon distributor will execute the proposed coupon campaign according to the agreed upon budget and the agreed upon redemption rate. If not, then process 100 may proceed to block 160 where the coupon distributor again determines a different budget and/or redemption rate. Although not depicted in FIG. 1, process 100 may end after one or more negative determinations at block 180 if no agreement is reached.

Submitting terms of a proposed coupon campaign to a coupon distributor may be carried out in multiple ways. In an embodiment, the coupon distributor maintains a web service that coupon providers may access over the Internet, that receives one or more terms of a proposed coupon campaign, and that responds with an affirmative or negative indication that the proposed coupon campaign is accepted. For example, a representative of the coupon provider directs a web browser (executing on a device operated by the representative) to a particular URL of the coupon distributor to display a corresponding web page. The representative enters the budget data and redemption data into the web page. The representative provides input that triggers the sending of the budget data and redemption data (for example, using HTTP) from the representative's device over a network to a server device operated by the coupon distributor. Thus, blocks 110 and 120 may involve the server device receiving the budget data and redemption data as input. Also, block 130 may involve the server device (or one or more other devices) calculating a coupon value based on the input.

In a related example, instead of a web page, the representative selects a software application that executes on the representative's device and that is dedicated to performing the functions of accepting input that reflects the terms of the proposed coupon campaign and indicating whether the coupon distributor will accept the proposed coupon campaign based on the terms. The software application may make the determination of whether to accept the coupon campaign or may communicate the terms of the proposed coupon campaign to a remote server that makes the determination. Alternatively, embodiments may use special-purpose computers configured with logic that performs functionally equivalent tasks and services.

In an embodiment, the coupon distributor allows a coupon provider to select one of multiple payment models to pay the coupon distributor for a proposed coupon campaign. One payment model is a print-based model in which the coupon provider pays the coupon distributor a fixed amount for each print of the provider's coupon by a potential customer. Another payment model described herein is target-based model in which the coupon provider indicates a budget (for example, a total dollar amount) and/or a target redemption rate (for example, between 400 and 420).

In an alternative embodiment, a human representative of a coupon provider verbally provides (for example, over the phone or in person) the budget data and/or redemption data to a human representative of a coupon distributor who enters the data into a device. That device and/or one or more other devices use the entered data to determine whether to accept a coupon campaign and, if so, what the coupon value should be.

3.0. Determining a Coupon Value

Embodiments are not limited to any particular technique for determining a coupon value. Certain embodiments may use programmed software, special-purpose computers, or other logic to implement algorithms, computations or other operations that may be expressed herein, for purposes of clarity and compactness, as equations. An equation that is used to calculate a coupon value for a proposed coupon campaign is referred to herein as a "coupon value equation." A coupon value equation takes into account how coupon values in previous coupon campaigns correlated with the redemption rates in those campaigns. The previous coupon campaigns may have been for the same product, different products, or even different product categories.

In an embodiment, the coupon value equation also takes into account a budget for the proposed coupon campaign. The greater the budget, the greater the likelihood that a coupon distributor can make a profit from executing the proposed coupon campaign. Conversely, if the budget is so low that no possible coupon value would allow the coupon distributor to make a profit, then the campaign distributor should not accept the proposed coupon campaign and, optionally, suggest a higher budget to the coupon manufacturer. The proposed budget may or may not be established by the coupon provider. For example, the coupon provider might only provide a redemption rate to the coupon distributor and the coupon distributor predicts, based on the redemption rate, a budget that will allow the coupon distributor to make a profit.

In an embodiment, the coupon value equation also takes into account an anticipated (or hoped for) redemption rate for the proposed coupon campaign. The anticipated redemption rate may or may not be established by the coupon provider. For example, the coupon provider might only provide a proposed budget to the coupon distributor and the coupon distributor predicts, based on the proposed budget, a redemption rate that will allow the coupon distributor to make a profit.

3.1 Example Equation

The following is an example equation the may be used to calculate a value of a coupon:

$$F = \underset{V}{\operatorname{argmax}}\{w(R - R_{min})(R_{max} - R) + (1-w)(B - R(V + \alpha_1) - FixedCost)\} \quad \text{EQUATION A}$$

The variables in Equation A are as follows: V is a possible coupon value, R is a historical redemption rate for a coupon with value V, B is the budget data, R_min is a minimum redemption rate, R_max is a maximum redemption rate, w is a weight, $\alpha_1$ is a fixed cost per coupon, FixedCost represents a fixed cost for running the proposed coupon campaign. The value of V that maximizes the value of F may be used as the value of the coupon.

As noted above, a coupon provider may specify a single value for redemption rate or may specify multiple values, for example, representing a minimum and a maximum. If the coupon provider provides a single value representing a redemption rate, then the coupon distributor might calculate $R_{max}$ and $R_{min}$ based on that value. For example, the coupon distributor might always identify an $R_{max}$ that is 10% greater than the specified value and identify an $R_{min}$, that is 10% less than the specified value.

The value of $\alpha_1$ may stay the same across multiple coupon campaigns and/or may fluctuate from one coupon campaign to another. One possible value of $\alpha$ is $0.08, which reflects a typical amount charged per coupon by a coupon clearinghouse. Thus, in embodiments described herein, the coupon distributor is responsible for paying a coupon clearinghouse (directly or indirectly) for the number of redemptions whereas, in a prior approach, the coupon provider is so responsible.

FixedCosts reflects some fixed cost that may exist for running a coupon campaign. The value of FixedCost may stay the same across multiple coupon campaigns and/or may fluctuate from one coupon campaign to another.

Equation A involves two main components or parts. The first part is the expression $w(R-R_{min})(R_{max}-R)$. The second part is the expression $(1-w)(B-R(V+\alpha_1)-FixedCosts)$. The first part of Equation A is negative when the value of R is greater than $R_{max}$. The first part is also negative when the value of R is less than $R_{min}$. Thus, the first part is positive when R is greater than $R_{min}$ and less than $R_{max}$.

The value of w is set by the coupon distributor. The value of w indicates how important it is that the redemption rate R is within bounds indicated or expected by a coupon provider relative to fact that there is money left over from the budget after all costs are taken into account. Thus, if w is 0, then the first part of Equation A is given no weight. Conversely, if w is 1, then the first part of Equation is given all the weight and the second part of Equation A has no bearing on the value of F. If the w is 0.5 or there is no w in Equation A, then the first and second parts are considered equal in importance.

Evaluation of the second part of Equation A indicates the revenue that the coupon distributor might make. In other words, the second part reflects the amount left over (if any) from the budget after the redemption rate times the sum of the coupon value and fixed costs per coupon, which is modeled as $\alpha_1$. The remaining value is multiplied by the remainder (i.e., 1−w) of the weight w that is not applied to the first part of Equation A.

If a coupon provider only provides redemption rate data (for example, $R_{min}$ and $R_{max}$ or a value that is used to derive $R_{min}$ and $R_{max}$) to a coupon distributor, then the coupon distributor might test different values of B and indicate, to the coupon provider, that the coupon distributor is willing to accept the proposed coupon campaign for a certain (reasonable) value of B. One or more devices operated by the coupon distributor might select a value of B in one of many ways. For example, one or more initial values of B might be tested where each of the values will probably or likely allow the coupon distributor to make a profit. Then, progressively lower values of B are automatically tested until a particular value of B that will probably or likely not allow the coupon distributor to make a profit is encountered. The particular value of B is then provided to the coupon distributor (for example, electronically from one device to another or orally between human representatives).

Conversely, one or more values of B might be tested where each of the values will probably or likely not allow the coupon distributor to make a profit. Then, progressively higher values of B are automatically tested until a particular value of B that will probably or likely allow the coupon distributor to make a profit is discovered.

In either scenario, the coupon distributor then provides the particular value of B to the coupon distributor as an offer to run the proposed coupon campaign in exchange for the particular value. The coupon distributor is given the choice to accept or reject the offer.

In an embodiment, instead of providing redemption rate data, a coupon provider only provides budget data to a coupon distributor. The coupon distributor might test different values of $R_{min}$ and $R_{max}$ and eventually indicate, to the coupon provider, that the coupon distributor is willing to accept the proposed coupon campaign provided that the coupon provider is satisfied with a redemption rate that falls within a certain range.

3.2 Redemption Rate Function

Typically, a greater coupon value correlates with a greater redemption rate. Conversely, a lower coupon value typically correlates with a lower redemption rate. Because the value of a coupon impacts the redemption rate of that coupon, the redemption rate R may be viewed as a function of coupon value V. A function that accepts a coupon value as input and is used to calculate a redemption rate based on the coupon value is referred to herein as "f(V)". Thus, in Equation A, R may be replaced with f(V), which causes Equation A to be as follows:

$$F = \underset{V}{\mathrm{argmax}}\{w(f(V) - R_{min})(R_{max} - f(V)) +$$
$$(1 - w)(B - f(V)(V + \alpha_1) - FixedCost)\}$$

In an embodiment, f(V) is based on historical data regarding previously completed coupon campaigns. For example, for a particular product, a coupon distributor stores first historical data that indicates the redemption rate of a first coupon with a first coupon value during a first coupon campaign and second historical data that indicates the redemption rate of a second coupon with a second coupon value during a second coupon campaign. With these two data points, the coupon distributor determines a function that represents the relationship between the coupon value and the redemption rate. With only two data points, f(V) may be a simple line (for example, f(V)=200V−100). If the coupon distributor has more than two data points, then f(V) may be a more complex (for example, quadratic) function.

In an embodiment, f(V) is generated prior to receiving details of a proposed coupon campaign, where those details are used to select a f(V). In an alternative embodiment, a f(V) that is used to compute a coupon value for a proposed coupon campaign is generated "on-the-fly", i.e., after receiving details of the proposed coupon campaign. If f(V) is modeled as a linear function, then the above equation becomes a quadratic optimization function, which in turn may be solved by a non-linear optimization method to yield an optimal value of V.

In an embodiment, a coupon distributor maintains multiple f(V) redemption rate functions (referred to herein as "redemption rate function f1(V)", "redemption rate function f2(V)", and so forth). In other words, a different redemption rate function f(V) may be used for determining a coupon value for different proposed coupon campaigns. For example, redemption rate function f1(V) may be used to determine a coupon value for one product and redemption rate function f2(V) may be used to determine a coupon value for a different product. A different redemption rate function f(V) may exist for different products because customers typically have different price sensitivities to different products.

As another example, redemption rate function f1(V) may be used to determine a coupon value for a particular product at one time (for example, during the summer) and redemption rate function f2(V) may be used to determine a coupon value for the same product at a later time (for example, during the winter). Again, a different redemption rate function f(V) may exist for the same product because consumers may have different price sensitivities to the same product at different times of the year or in different years. This phenomenon is referred to as "seasonality."

As another example, redemption rate function f1(V) may be used to determine a coupon value for a particular product where the proposed coupon campaign targets a certain region of the country (for example, the Southwest) and redemption rate function f2(V) may be used to determine a coupon value for the same product where the proposed coupon campaign targets another region of the country (for example, the Northeast). Again, a different redemption rate function f(V) may exist for the same product because consumers in different parts of the country may have different price sensitivities to the same product. This phenomenon is referred to as "regionality."

If a product of a proposed coupon campaign is new (for example, not subject of a previous coupon campaigns, at least not one run by the coupon distributor), then the coupon distributor might rely on a redemption rate function f(V) that is based on one or more previous coupon campaigns for one or more other products made by the same manufacturer. As an example, if the product of the proposed coupon campaign is canned tomatoes, then a redemption rate function f(V) that is based on the one or more previous coupon campaigns from the same manufacturer regarding canned corn and/or canned green beans may be used.

Alternatively, the coupon distributor might rely on a redemption rate function f(V) that is based on one or more previous campaigns for one or more products that belong to a particular product category to which the specific product also belongs. As an example, if the product of the proposed coupon campaign is for a certain brand of diapers, then a redemption rate function f(V) that is based on one or more previous diaper coupon campaigns may exist, even though the one or more previous diaper coupon campaigns were for diapers from different manufacturers. Some manufacturers are associated with multiple brands instead of only a single brand. In such cases, a coupon distributor might maintain a different redemption rate function f(V) for each brand of multiple brands, even though the multiple brands may originate from the same manufacturer. A "brand" is a name, term, design, symbol, or any other feature that identifies one seller's product as distinct from products of other sellers. A brand may identify one item, a family of items, or all items of that seller (for example, Great Value). A typical grocery store carries or sells hundreds of brands, some of which might include General Mills, Betty Crocker, Kelloggs, Quaker, and V8.

A "product category" refers to a type of product, such as cereal, laundry detergent, diapers, and canned tomatoes. Some product categories are subsets of other product categories. For example, a canned peaches product category is a subset of a canned fruit product category, which is a subset of a canned goods category. Thus, a coupon distributor may generate a different redemption rate function f(V) for each of multiple product categories, regardless of the number of different brands reflected in each product category.

In an embodiment, in response to receiving details of a proposed coupon campaign, one or more of those details are used to select a f(V) among a plurality of f(V)s. The f(V) that is based on attributes that match or most closely match those of the proposed coupon campaign is used to determine a redemption rate given a certain coupon value V. The following is an example of a number of different f(V)s from which a single f(V) may be selected:

(a) If C1=Breakfast and C2=Cereal, then f(V)=0.1+3V
(b) If C1=Breakfast and C2=Oatmeal, then f(V)=0.3+2V
(c) If C1=Dinners and C2=Frozen, then f(V)=3+0.1V
(d) If C1=Dinners and C2=Fresh, then f(V)=2+3V
(e) If C1=Breakfast, then f(V)=0.2+1.8V
(f) If C1=Dinners, then f(V)=2.8+2.7V.

Given these f(V)s, if a proposed coupon campaign is for a breakfast item and the breakfast item is cereal, then (a) (i.e., f(V)=0.1+3V) is used to compute a redemption rate given a particular value V. If a proposed coupon campaign is for a breakfast item that is not or cannot be classified into one of the four enumerated breakfast categories above (i.e., cereal, oatmeal, frozen, and fresh), then (e) (i.e., f(V)=0.2+1.8V) is used to compute a redemption rate given a particular value V.

As can be appreciated, given the number of attributes of a proposed coupon campaign, tens, hundreds, or even thousands of f(V)s may be computed. Each f(V) may be represented in a table or other database object that stores information about the attributes of the coupon campaigns upon which the f(V) is based. Non-limiting examples of attributes may comprise the specific product, the brand, the manufacturer, the coupon provider, the coupon value, the percentage discount, one or more product categories to which the product belongs, the time of year of the campaign, and geographic location of the campaign.

In an embodiment, the attribute values of a plurality of f(V)s are indexed such that, given a particular attribute value, one or more f(V)s may be identified based on the particular attribute value. In this way, one or more attributes of each f(V) stored in memory or on disk do not have to be scanned. For example, in response to receiving details of a proposed coupon campaign, the brand of the proposed coupon campaign is identified. An index that is generated based on brand is used to identify one or more f(V)s that are generated based on one or more previous coupon campaigns that involved that brand. If a set of multiple f(V)s are identified using the index, then one or more other attributes of the proposed coupon campaign may be used to select a particular f(V) from that set. Continuing with the example, if three f(V)s that each correspond to the brand are identified, then, for example, the product category and percentage discount of the proposed coupon campaign might be used to select one of the three f(V)s.

As noted above, a coupon distributor may generate a redemption rate function f(V) based on data from a single previous coupon campaign or multiple previous coupon campaigns. If a redemption rate function f(V) is based on multiple previous coupon campaigns, then those previous coupon campaigns may have been for the same product, for different products in the same product category, or for different products of the same brand or manufacturer but in different product categories.

In the case where a f(V) is based on data from multiple previous coupon campaigns, two or more of the previous coupon campaigns may be "incongruous" with respect to each other. An set of "incongruous" coupon campaigns are campaigns that differ on a relevant attribute, such as brand, product, product category, seasonality, coupon value, percentage discount, and geographic target. Thus, for example, two previous coupon campaigns could have been for the same product (and, thus, for the same brand), the same coupon value, the same geographic target, but for different times of the year, such as winter and summer. From these two previous coupon campaigns, two f(V)s may be generated: one that can be used for future winter campaigns and one that can be used for future summer campaigns. The "winter" f(V) may be generated by weighting the results of the "winter" campaign greater than the results of the "summer" campaign. Conversely, the "summer" f(V) may be generated by weighting the results of the "summer" campaign greater than the results of the "winter" campaign. Later, when a computing device of the coupon distributor receives a proposed coupon campaign, the computing device might determine the season (or time of year) in which the proposed campaign is to run and use that determination to select either the "winter" f(V) or the "summer" f(V).

As another example, a coupon distributor may generate and use an f(V) that is based on a first set of one or more previous coupon campaigns for a particular product that is subject of a particular proposed coupon campaign, and a second set of one or more previous coupon campaigns for different products, which may be for products in the same product category as the particular product and/or for products from the same manufacturer or brand. Such an f(V) may be generated because there may be few (for example, only one) previous campaign for the particular product while there may be many previous campaigns for similar products. In generating such an f(V), the results of the first set of previous campaign(s) may be given more weight relative to the weight given to the results of the second set of previous campaign(s) to reflect the fact that the first set of previous campaign(s) should be more predictive (of future redemption rates given certain coupon values) than the second set of previous campaign(s).

As noted herein, there are multiple attributes or characteristics, of a completed coupon campaign, that can be used to generate an f(V). Such attributes might be categorized into four main groups: Provider and Coupon Data, User Data, Industry Data, and External Data. Examples of Provider and Coupon Data include history and information about the coupon provider (or manufacturer if the coupon provider and the manufacturer are different), the brand, the specific product, the product category, and percentage discount, each of which is described above. Examples of User Data include (1) history about how this offer and/or similar offers (i.e., in other campaigns) performed regarding prints and redemptions for known users and (2) demographic information about such users. Examples of Industry Data include information about similar campaigns regarding the same or similar product category and their respective performance history. Examples of External Data include information about the overall population of consumers and how they consume the product or similar products, such as purchase frequency, average price, buyers by geographic location (described herein), and seasonality (also described herein).

4.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
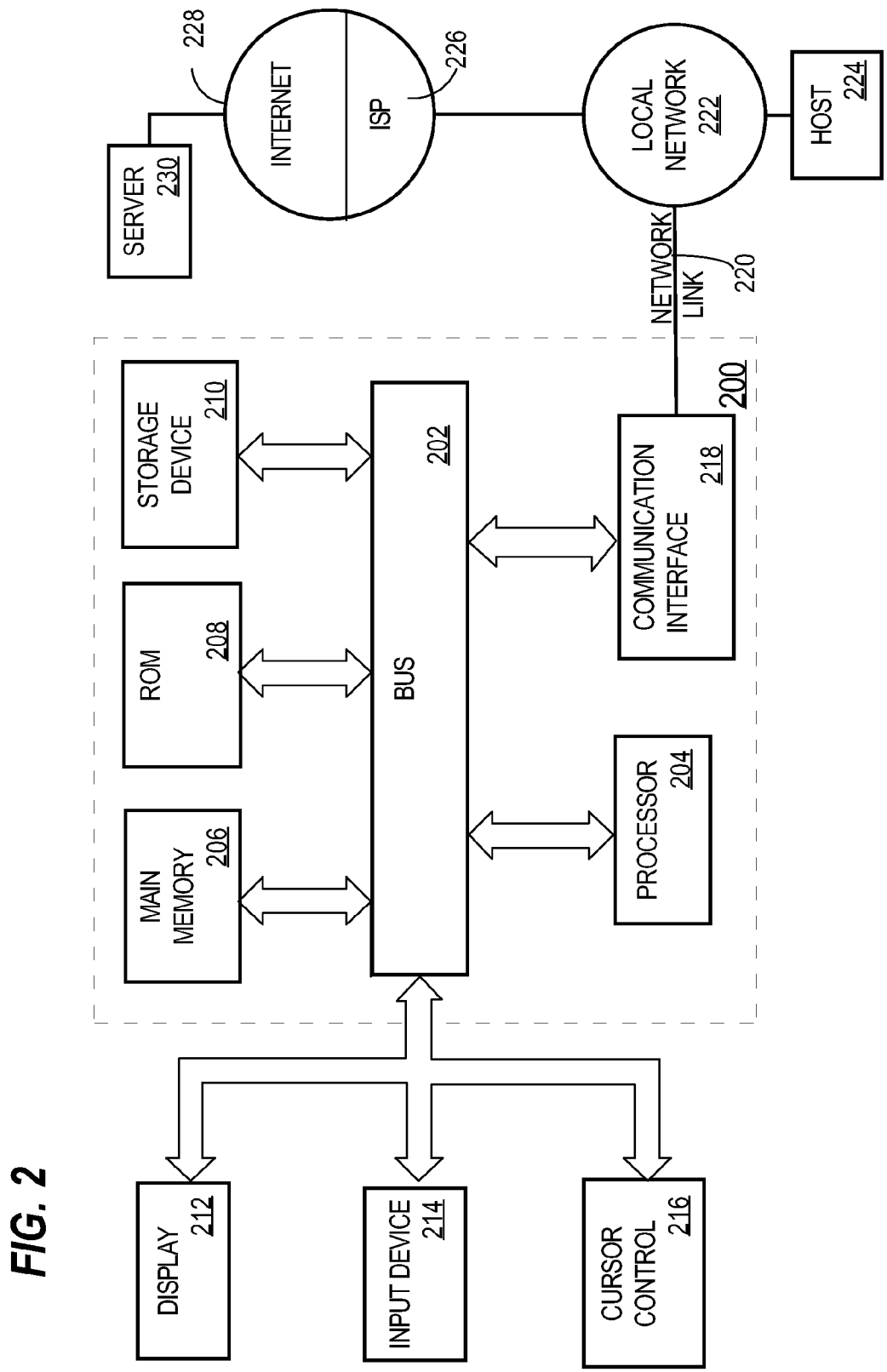
FIG. 2 is block diagram of a computer system upon which embodiments of the invention may be implemented.

For example, FIG. 2 is a block diagram that illustrates a computer system 200. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (for example, x) and a second axis (for example, y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process blocks described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and/or stored in storage device 210, or other non-volatile storage for later execution.

5.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising, prior to distributing a coupon:
   receiving, from a coupon provider that provides a product or service to which the coupon pertains, budget data that indicates an amount to spend, by the coupon provider, on coupon services relating to the issuance of the coupon;
   receiving redemption data that indicates a number of anticipated redemptions of the coupon; and
   based on the budget data and the redemption data and data about one or more previous coupon campaigns, computing, by a coupon distributor that is different than the coupon provider, a particular value of the coupon;
   establishing, by the coupon distributor, the particular value as the value of the coupon in a coupon campaign that is to be initiated by the coupon provider;
   sending the particular value to the coupon provider;
   wherein computing is performed by one or more computing devices.

2. A method comprising, prior to distributing a coupon of a proposed coupon campaign:
   receiving, from a coupon provider that provides a product or service to which the coupon pertains, at a coupon distributor, proposed coupon campaign data regarding the proposed coupon campaign, wherein the proposed coupon campaign data indicates one or more of a target budget or a target redemption rate;
   determining, based on the proposed coupon campaign data, at the coupon distributor, whether to accept the proposed coupon campaign;
   determining, based on the proposed coupon campaign data and data previously collected, at the coupon distributor, a value for the coupon of the proposed coupon campaign;
   in response to accepting the proposed coupon campaign, sending, to the coupon provider, an indication of the value for the coupon;
   wherein determining the value is performed by one or more computing devices.

3. One or more storage media storing instructions which, when executed by one or more processors, cause, prior to distributing a coupon:
   receiving, from a coupon provider that provides a product or service to which the coupon pertains, budget data that indicates an amount to spend, by the coupon provider, on coupon services relating to the issuance of the coupon;
   receiving redemption data that indicates a number of anticipated redemptions of the coupon; and
   based on the budget data, the redemption data, and data about one or more previous coupon campaigns, computing, by a coupon distributor that is different than the coupon provider, a particular value of the coupon;

establishing, by the coupon distributor, the particular value as the value of the coupon in a coupon campaign that is to be initiated by the coupon provider;

sending the particular value to the coupon provider.

4. The one or more storage media of claim 3, wherein the instructions, when executed by one or more processors, further cause receiving the redemption data and the budget data from the coupon provider.

5. The one or more storage media of claim 3, wherein the instructions, when executed by one or more processors, further cause receiving one of the budget data and the redemption data from the coupon provider and receiving the other of the budget data and the redemption data from the coupon distributor that is different than the coupon provider.

6. The one or more storage media of claim 3, wherein the instructions, when executed by one or more processors, further cause receiving the redemption data and the budget data over a network from a client device of the coupon provider.

7. The one or more storage media of claim 6, wherein the instructions, when executed by one or more processors, further cause sending, over the network to the client device, a user interface that includes one or more input fields configured to receive the budget data and the redemption data into the one or more input fields from the client device.

8. The one or more storage media of claim 7, wherein:
the user interface is configured for the client device to select one payment model from among a plurality of payment models;
a first payment model of the plurality of payment models is a print-based payment model;
a second payment model of the plurality of payment models is a budget-based payment model.

9. The one or more storage media of claim 3, wherein the instructions, when executed by one or more processors, further cause computing the particular value of the coupon according to:

$$F = \operatorname*{argmax}_{V} \{w(R - R_{min})(R_{max} - R) + (1 - w)(B - R(V + \alpha_1) - FixedCost)\}$$

where R is a historical redemption rate for a coupon with value V, B is the budget data, R_min is a minimum redemption rate, R_max is a maximum redemption rate, w is a weight, $\alpha_1$ is a fixed cost per coupon, and FixedCost represents a fixed cost for running a coupon campaign.

10. The one or more storage media of claim 3, wherein computing the particular value of the coupon comprises using a function that calculates a plurality of redemption rates based on different possible values of the coupon.

11. The one or more storage media of claim 10, wherein:
the function is a first function;
the instructions, when executed by one or more processors, further cause, after computing the particular value of the coupon:
receiving second budget data that indicates a second amount to spend on coupon services relating to the issuance of a second coupon;
receiving second redemption data that indicates a second number of redemptions of the second coupon;
based on the second budget data and the second redemption data, computing a value of the second coupon;
computing the value of the second coupon comprises using a second function that is different than the first function and that calculates a second plurality of redemption rates based on different possible values of the second coupon.

12. The one or more storage media of claim 10, wherein:
the coupon is a first coupon for a first product;
the instructions, when executed by one or more processors, further cause, after computing the particular value of the coupon:
receiving second budget data that indicates a second amount to spend on coupon services relating to the issuance of a second coupon for a second product that is different than the first product;
receiving second redemption data that indicates a second number of redemptions of the second coupon;
based on the second budget data and the second redemption data, computing a value of the second coupon;
computing the value of the second coupon comprises using the function that calculates a second plurality of redemption rates based on different possible values of the second coupon.

13. The one or more storage media of claim 10, wherein:
the coupon is for a first product; and
the function is based on historical data relating to one or more previous coupon campaigns for one or more products that are different than the first product.

14. The one or more storage media of claim 13, wherein the first product is produced by a first manufacturer and the one or more products are produced by one or more second manufacturers that are different than the first manufacturer.

15. The one or more storage media of claim 3, wherein computing the particular value is also based on a historical redemption rate.

16. One or more storage media storing instructions which, when executed by one or more processors, cause, prior to distributing a coupon of a proposed coupon campaign:
receiving, from a coupon provider that provides a product or service to which the coupon pertains, at a coupon distributor, proposed coupon campaign data regarding the proposed coupon campaign, wherein the proposed coupon campaign data indicates one or more of a target budget or a target redemption rate;
determining, based on the proposed coupon campaign data, at the coupon distributor, whether to accept the proposed coupon campaign;
determining, based on the proposed coupon campaign data and data previously collected, at the coupon distributor, a value for the coupon of the proposed coupon campaign;
in response to accepting the proposed coupon campaign, sending, to the coupon provider, an indication of the value for the coupon.

17. The one or more storage media of claim 16, wherein the instructions, when executed by one or more processors, further cause, prior to accepting the proposed coupon campaign:
sending, to the coupon provider, one or more new terms for the proposed coupon campaign, wherein the one or more new terms is one of a proposed budget or a proposed redemption rate;
receiving, from the coupon provider, an indication of whether the coupon provider accepts the one or more new terms.

18. An apparatus comprising:
a first logic, implemented at least partially in hardware, that is configured to receive, from a coupon provider that provides a product or service to which a coupon pertains, budget data that indicates an amount to spend, by the coupon provider, on coupon services relating to the issuance of the coupon;

a second logic, implemented at least partially in hardware, that is configured to receive redemption data that indicates a number of anticipated redemptions of the coupon; and a third logic, implemented at least partially in hardware, that is configured to compute, based on the budget data and the redemption data and data about one or more previous coupon campaigns, by a coupon distributor that is different than the coupon provider, a particular value of the coupon;

a fourth logic, implemented at least partially in hardware, that is configured to establish, by the coupon distributor, the particular value as the value of the coupon in a coupon campaign that is to be initiated by the coupon provider;

a fifth logic, implemented at least partially in hardware, that is configured to send the particular value to the coupon provider prior to distributing the coupon.

19. The apparatus of claim 18, further comprising a sixth logic, implemented at least partially in hardware, that is configured to receive the redemption data and the budget data from the coupon provider.

20. The apparatus of claim 18, further comprising a sixth logic, implemented at least partially in hardware, that is configured to receive one of the budget data and the redemption data from the coupon provider and receives the other of the budget data and the redemption data from the coupon distributor that is different than the coupon provider.

21. The apparatus of claim 18, further comprising a sixth logic, implemented at least partially in hardware, that is configured to receive the redemption data and the budget data over a network from a client device of the coupon provider.

22. The apparatus of claim 21, further comprising a seventh logic, implemented at least partially in hardware, that is configured to send, over the network to the client device, a user interface that includes one or more input fields configured to receive the budget data and the redemption data into the one or more input fields from the client device.

23. The apparatus of claim 22, wherein:
the user interface is configured for the client device to select one payment model from among a plurality of payment models;
a first payment model of the plurality of payment models is a print-based payment model;
a second payment model of the plurality of payment models is a budget-based payment model.

24. The apparatus of claim 18, wherein the particular value of the coupon is computed according to:

$$F = \underset{V}{\operatorname{argmax}}\{w(R - R_{min})(R_{max} - R) + (1 - w)(B - R(V + \alpha_1) - FixedCost)\}$$

where R is a historical redemption rate for a coupon with value V, B is the budget data, R_min is a minimum redemption rate, R_max is a maximum redemption rate, w is a weight, $\alpha_1$ is a fixed cost per coupon, and FixedCost represents a fixed cost for running a coupon campaign.

25. The apparatus of claim 18, further comprising a sixth logic, implemented at least partially in hardware, that is configured to compute the particular value of the coupon using a function that calculates a plurality of redemption rates based on different possible values of the coupon.

26. The apparatus of claim 25, wherein the function is a first function; further comprising a seventh logic, implemented at least partially in hardware, that is configured to, after computing the particular value of the coupon:
receive second budget data that indicates a second amount to spend on coupon services relating to the issuance of a second coupon;
receive second redemption data that indicates a second number of redemptions of the second coupon;
based on the second budget data and the second redemption data, compute a value of the second coupon;
wherein seventh logic is further configured to use a second function that is different than the first function and calculate a second plurality of redemption rates based on different possible values of the second coupon.

27. The apparatus of claim 25, wherein the coupon is a first coupon for a first product, wherein the apparatus further comprising a seventh logic, implemented at least partially in hardware, that is configured to, after computing the particular value of the coupon:
receive second budget data that indicates a second amount to spend on coupon services relating to the issuance of a second coupon for a second product that is different than the first product;
receive second redemption data that indicates a second number of redemptions of the second coupon;
based on the second budget data and the second redemption data, compute a value of the second coupon;
wherein the seventh logic is further configured to use the function that calculates a second plurality of redemption rates based on different possible values of the second coupon.

28. The apparatus of claim 25, wherein:
the coupon is for a first product; and
the function is based on historical data relating to one or more previous coupon campaigns for one or more products that are different than the first product.

29. The apparatus of claim 28, wherein the first product is produced by a first manufacturer and the one or more products are produced by one or more second manufacturers that are different than the first manufacturer.

30. The apparatus of claim 18, wherein the third logic is configured to compute the particular value also based on a historical redemption rate.

31. An apparatus comprising:
a first logic, implemented at least partially in hardware, that is configured to receive, from a coupon provider that provides a product or service to which a coupon pertains, at a coupon distributor, proposed coupon campaign data regarding a proposed coupon campaign, wherein the proposed coupon campaign data indicates one or more of a target budget or a target redemption rate;
a second logic, implemented at least partially in hardware, that is configured to determine, based on the proposed coupon campaign data, at the coupon distributor, whether to accept the proposed coupon campaign;
a third logic, implemented at least partially in hardware, that is configured to determine, based on the proposed coupon campaign data and data previously collected, at the coupon distributor, a value for the coupon of the proposed coupon campaign;
a fourth logic, implemented at least partially in hardware, that is configured to, in response to accepting the proposed coupon campaign, send, to the coupon provider, an indication of the value for the coupon prior to distributing the coupon of the proposed coupon campaign.

32. The apparatus of claim 31, further comprising a fifth logic, implemented at least partially in hardware, that is configured to, prior to accepting the proposed coupon campaign:

send, to the coupon provider, one or more new terms for the proposed coupon campaign, wherein the one or more new terms is one of a proposed budget or a proposed redemption rate;

receive, from the coupon provider, an indication of whether the coupon provider accepts the one or more new terms.

* * * * *